C. H. KICKLIGHTER.
METHOD OF ELECTRICALLY WELDING METAL PLATES.
APPLICATION FILED MAY 5, 1920.
1,347,278.
Patented July 20, 1920.
2 SHEETS—SHEET 1.
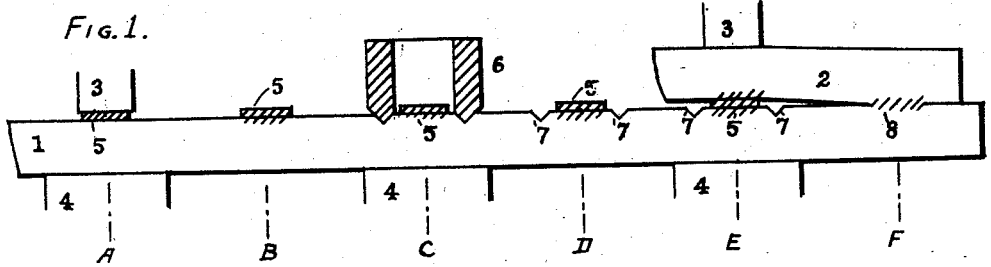
Fig. 1.
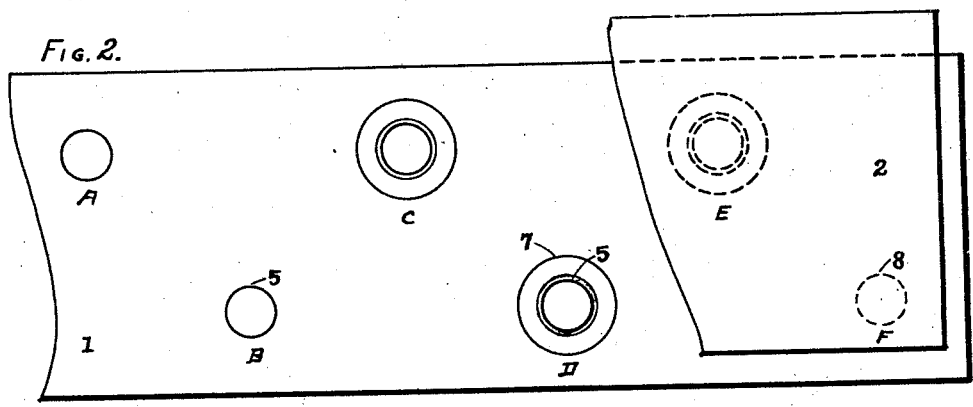
Fig. 2.
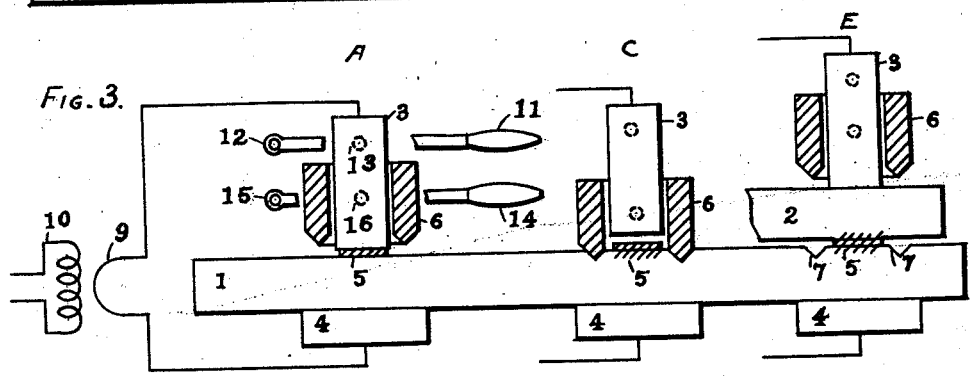
Fig. 3.
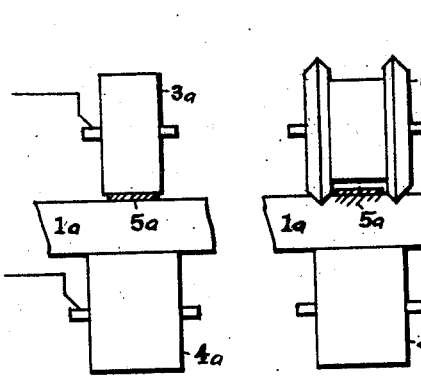
Fig. 4.
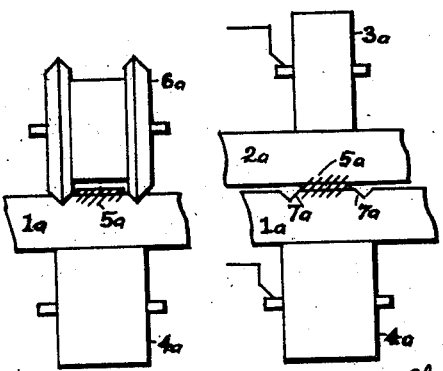
Fig. 5.
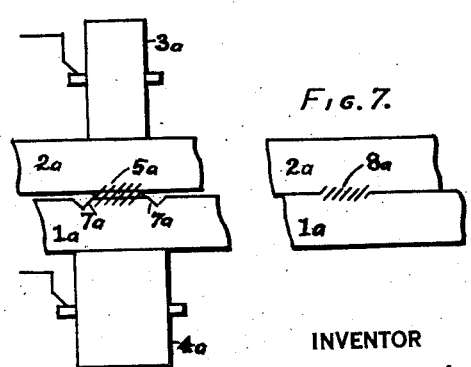
Fig. 6.
Fig. 7.
INVENTOR
Charles H. Kicklighter.

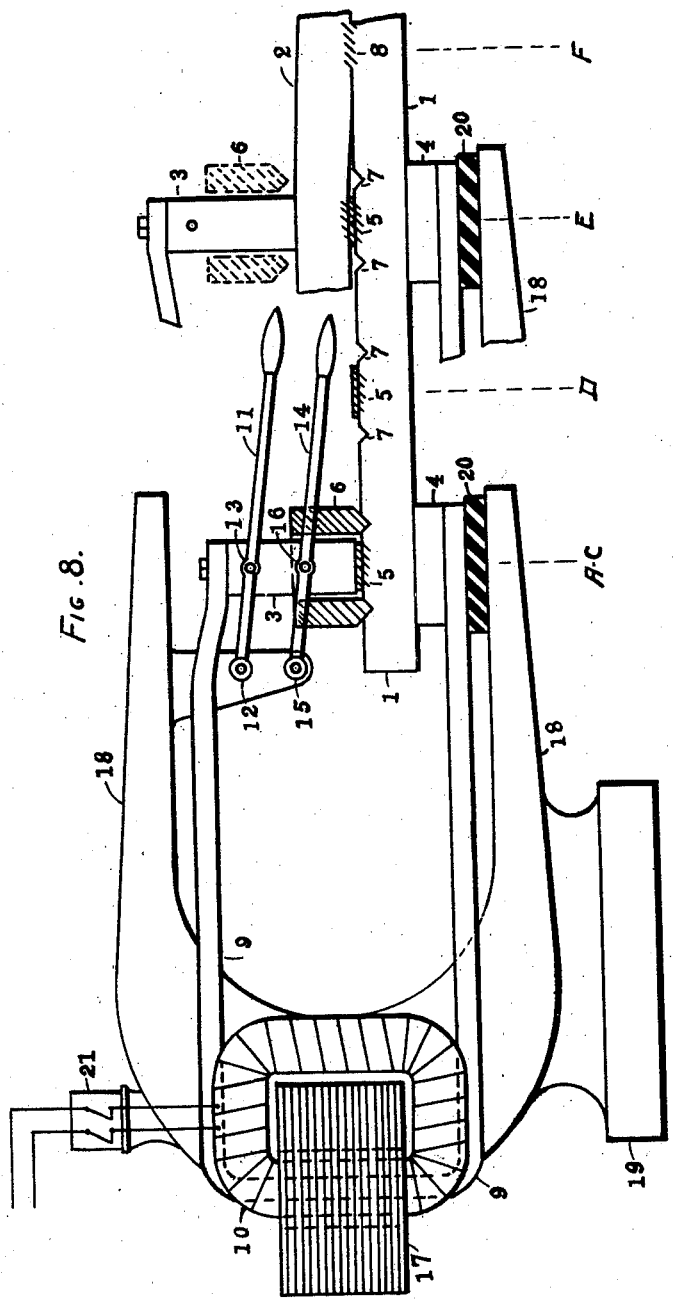

UNITED STATES PATENT OFFICE.

CHARLES H. KICKLIGHTER, OF MACON, GEORGIA.

METHOD OF ELECTRICALLY WELDING METAL PLATES.

1,347,278.

Specification of Letters Patent. Patented July 20, 1920.

Application filed May 5, 1920. Serial No. 379,170.

*To all whom it may concern:*

Be it known that I, CHARLES H. KICK-LIGHTER, a citizen of the United States, and a resident of Macon, in the county of Bibb and State of Georgia, have invented new and useful Improvements in Methods of Electrically Welding Metal Plates, of which the following is a specification.

The invention relates to a method of fastening metal plates by the use of electric heating current and mechanical pressure, in which case heating current and pressure are first employed to weld a small flat piece of metal at a spot on the surface of one plate and to form a depression about this spot, and subsequently heating current and pressure are employed to weld the other plate to the flat piece of metal and to force the two plates into immediate contact about the position of the welds.

The object of the invention is to afford a quick and simple method of fastening thick metal plates or similar pieces of metal by the electric welding process. When it is attempted to weld thick plates by the usual spot welding method, a tremendous pressure is required to overcome the irregularities and rigidity of the cold plates, and to force them into firm contact between the welding terminals. Even then, a large current is required, as this current spreads considerably, and much of the heat is wasted. By the method herein described, the area subjected to pressure and to the passage of the heating current is quite restricted. The mechanical pressure required is not great, and the amount of heating current is relatively small. A light and portable machine can in this way be utilized to make welds between large and thick plates. A light and portable welder is especially desirable, because of the limited crane facilities at some ship ways and at the sites of construction of steel frame structures. Here it will become necessary to swing the welding machines by cranes into various positions to make the desired welds during the construction work.

I have used a number of methods of uniting thick pieces of metal, and consider this an important step in the progress of the art. The steps in the operation are simple, rapid and practical. Their number, for effective results, seems to be reduced to a minimum. The number of times the plates have to be moved about has been reduced. The exterior surfaces of the plates are plane, and are not deformed, so that the simple application of flat end welding-terminals or terminal blocks, are effective in making the final welds, and will bring the plates into immediate contact with a comparatively light pressure and a single operation. The plates are strained less, and lighter machinery can be used than when it is attempted to punch projections through the cold plates. Plane surfaces of contact, where welds are to be effected, give best results, and require less welding current, as all points of such surfaces are brought to a welding heat at about the same instant, and a thorough fusion of the metal at all points is obtained by the time the metal is softened sufficiently to be forced back and crowded into the depressions.

The depressions around the disks are essential, as it is very difficult to force the plates into immediate contact about the disks without the depressions. The fusion of the disks to the surface of one plate first is essential, as it prevents annoyance and the trouble of having them displaced during subsequent operations. It would appear that the only limit to the thickness of the plates which can be united by this method is the providing of means to bend them through a very small distance sufficiently to bring them into contact as the welding proceeds from spot to spot.

A plurality of welds at spots properly staggered makes an effective seam or joint between thick plates of metal. Or continuous welds may be made by this method along paths parallel to the edges of the plates being joined.

Figure 1 is a diagrammatic sketch, partially sectioned, showing one application of the invention and illustrating the several steps in the operation.

Fig. 2 is a top view of the plates in Fig. 1.

Fig. 3 is a sketch illustrating a machine for performing the operations described in Fig. 1.

Fig. 4 is a sketch illustrating the welding of a flat strip to a plate preparatory for a continuous weld.

Fig. 5 is a sketch illustrating the forming of depressions on either side of the strip of Fig. 4.

Fig. 6 is a sketch illustrating the making of a continuous welded connection between two plates.

Fig. 7 is a sketch illustrating the completed welded connection between two plates after the operations of Figs. 4, 5 and 6.

Fig. 8 represents a machine capable of performing the operations described in Fig. 1.

Referring to Figs. 1 and 2, the plates or pieces of metal 1 and 2 are to be fastened together. At position A, the terminals 3 and 4 of an electric welding machine are being applied to weld the disk 5 to one of the plates 1. The terminal 4 is, in this case, a bed or anvil or arm of good electrical conductivity upon which the plate 1 is supported for the several operations. At position B, the disk or flat metallic body is shown as welded or fused to the plate 1 after the completion of the operation of position A. Disk 5 may be thoroughly welded to plate 1, or it may be but partially fused thereto, the completion of the welding to take place at the later stage E. The degree of the welding of disk 5 to plate 1 should be sufficient to hold it securely in place during subsequent operations. At position C, the edge of annular tool 6 is being forced down upon the surface of plate 1 immediately around and in close proximity to disk 5, so as to form a depression 7 thereabout. The amount of metal displaced is small, and this can easily be packed down while the plate around the weld is still heated without appreciably bending the plate or deforming its surfaces. At position D the plate is shown after the completion of the operations as illustrated in positions A and C. It makes little difference which of these operations is performed first. They may be performed simultaneously if desired. The advantage in performing these steps in the order illustrated is that annular tool 6 can be applied immediately after the welding terminal 3 or during the latter part of its application while the metal of the plate just around disk 5 is quite hot and plastic.

At position E, the plate 2 is being welded to the disk 5 by the passage of welding current between terminals 3 and 4 of the same or another welding machine. The pressure is forcing the disk 5 downward and crowding heated metal into the depression 7—7. At position F the completed operation is illustrated, there being a welded union at 8.

Referring now to Fig. 3, the stations A, C and E of Fig. 1 are shown more in detail. At station A, the disk 5 is being welded to plate 1 by the passage of electric heating current between terminals 3 and 4 of the secondary 9 of a transformer of which 10 is the primary winding. Pressure is applied in this case, by means of a lever 11 fulcrumed at 12 and trunnioned to terminal 3 at 13. Annular tool 6 may be forced down, in this case, by a lever 14, fulcrumed at 15 and trunnioned to tool 6 at 16. For the sake of simplicity and clearness, the levers are shown sectioned away in position A and are omitted entirely in positions C and E. At position C the welding terminal 3 has been lifted from the work, and annular tool 6 has been forced down so as to form the annular depression in the heated metal. As stated above the operations at A and C may be performed in reverse order or simultaneously if desired. At position E, plate 2 has been brought into contact with the upper surface of disk 5. By the passage of electric current between terminals 3 and 4, disk 5 is being welded to plate 2 and to plate 1 also, if the previous fusion thereto was not complete. Disk 5 and the metal of the plate immediately below it are being softened so as to be forced downward and to be crowded into the depression 7—7. The plates 1 and 2 can then come into immediate contact.

Fig. 8 will be next considered as representing a complete machine capable of performing the operations described in Fig. 1. At station A—C, the disk 5 is being or has just been welded or fused to plate 1 by the passage of electric current between terminals 3 and 4 of the secondary 9—9 of a transformer of which 10 is the primary winding and 17 the laminated core. Pressure is applied in this case, by means of a lever 11, fulcrumed at 12 and trunnioned to terminal 3 at 13. Annular tool 6 is being forced down, while the metal is hot, by a lever 14, in this case, fulcrumed at 15 and trunnioned to tool 6 at 16. Instead of hand levers 11 and 14 as illustrated in the drawings, it is obvious that other means can be employed for obtaining mechanical pressure, as electro-magnets, hydraulic pressure, pneumatic pressure or the well known toggle joint. Moreover, an impulsive force might be applied to annular tool 6, as elsewhere herein pointed out. The frame 18 of the welder is provided with a base 19 and is of a yoke or horse-shoe shape, being thus adapted to transmit the mechanical pressure to the work. The frame 18 supports at its back the core 17, primary 10 and secondary 9 of the transformer. The frame arms support the terminals of secondary 9, and the fulcrumed ends 12 and 15 of levers 11 and 14 repectively. A block of insulating material 20 separates the lower secondary terminal 4 from the lower arm of the frame. A switch 21 serves to connect the primary winding 10 to the supply line of electric power. The annular tool 6 and insulation block are shown in section.

At position D, the welded disk 5 and depression 7 in the plate 1 are shown after the completion of the operations, as illustrated in position A—C.

At position E, plate 2 has been brought into contact with the upper surface of disk 5. By the passage of electric current between terminals 3 and 4 of the same or another transformer, disk 5 is being welded to plate 2 and to plate 1 also, if the previous fusion thereto was not complete. The softened metal will at the same time be crowded into the depression 7—7, and the plates 1 and 2 brought into immediate contact.

At station F a completed weld is illustrated at 8.

Referring now to Figs. 4, 5, 6 and 7, the plates $1^a$ and $2^a$ are to be fastened together by a continuous weld. Fig. 4 illustrates the welding or fusion of a long thin strip of metal $5^a$ to the surface of plate $1^a$ by being subjected to pressure and heating electric current between roller-terminals $3^a$ and $4^a$. Fig. 5 illustrates the forming of two depressions in the surface of plate $1^a$ immediately adjacent to strip $5^a$. This is accomplished by the plate being passed between rollers $6^a$ and $4^a$, preferably while the plate is still heated immediately after the operation of Fig. 4. Roller $6^a$ is provided with two flanged edges for making the desired depressions. Fig. 6 illustrates the welded connection between plates $3^a$ and $4^a$, the assembled parts being passed between pressure-terminal-rollers $3^a$ and $4^a$. The pressure and passage of electric current between the rollers causes strip $5^a$ to be welded to plate $2^a$ and also further welded to plate $1^a$, if that was not complete in the preliminary process. Strip $5^a$ is softened and forced down while heated metal is crowded into the depressions $7^a$ so that the plates may come into immediate contact. Fig. 7 shows the plates $1^a$ and $2^a$ in immediate contact about the position of the weld $8^a$ after the completion of the operations of Figs. 4, 5 and 6.

The operation is apparent. A portion of one plate, with a small disk or flat piece of metal placed on its surface at the desired position of union, is brought between the terminals of an electric heating or welding machine and subjected to pressure and electric heating current. An annular or other proper shaped tool is forced down upon the surface of the plate in close proximity to the position of desired union. The disk or flat piece of metal is welded to the surface of the plate by the passage of the electric current and a depression is formed in the surface of the plate immediately adjacent to the position of the flat piece of metal by the pressure tool. When the desired number of flat pieces of metal have been welded to the plate and the depressions adjacent thereto have been formed, another plate is brought into contact with the upper or opposite surfaces of the disks or flat pieces of metal. The terminals of an electric welding machine are applied to the opposite surfaces of the plates and the juxtaposed parts at each position are subjected to pressure and heating electric current. The contacting surfaces are welded together, the disks or flat pieces of metal are forced downward and heated metal is crowded into the depressions until the plates come into immediate contact about the position of the weld.

Various modifications at once suggest themselves which fall within the spirit of this invention. For instance, the annular depression might be formed in the surface of the plate by means of pounding with a hammer on a tool of proper shape, either before or after the welding of metal to the plate surface. The welding operation is applicable to structural steel members of various forms, as beams, columns, angle irons, etc., as well as to plates. The final operation of welding on the last plate, or structural member, may be at a subsequent time and in the field or at the site of the erection of a structure and may be, and usually would be, effected by a different welding machine from that used in welding the disks to and forming the depressions in the first plate.

What I claim is:

1. The method of fastening two pieces of metal together, face to face, which consists of welding flat metallic bodies to the surface of one of the pieces of metal by the application of pressure and heating electric current and forming depressions thereabout in close proximity thereto by applying a tool with annular edge to said surface, of bringing into contact with the metallic bodies the surface of the second said piece of metal, and by the application of pressure and heating electric current of welding the second piece of metal to the metallic bodies and forcing the metallic bodies into the depressions adjacent thereto so that the said pieces of metal come into immediate contact.

2. The method of fastening two metal plates together, face to face, which consists of welding metallic disks to the surface of one of said plates by the application of pressure and heating electric current and forming depressions thereabout in close proximity thereto, of bringing into contact with the metallic disks the surface of the second said plate, and by the application of pressure and heating electric current of welding the second plate to the metallic disks and forcing the metallic disks into the adjacent depressions so that the plates come into immediate contact.

3. The method of fastening the surfaces of two plates of metal together, which consists of fusing metallic bodies to the surface of one of the plates with depressions immediately adjacent thereto in said surface, of bringing into contact with the metallic bodies the surface of the other plate, and by the application of pressure and heating electric current of welding the surface of the second plate to the metallic bodies displacing the metallic bodies and forcing metal into the adjacent depressions so as to allow the plates to come into immediate contact.

4. The method of fastening the surfaces of two pieces of metal together, face to face, which consists of electrically welding metal to the face of one in spots thereon surrounded by depressions formed immediately adjacent thereto, of bringing into contact with the welded metal the face of the other piece of metal and by the application of pressure and heating electric current of welding the surface of the second piece of metal to the said welded metal at the said spots and forcing backward and displacing the said welded metal so that the two pieces of metal come into immediate contact.

5. The method of forming a joint or seam between two metal plates which consists of electrically welding metal to the face of one in spots thereon with depressions formed immediately adjacent thereto, of bringing into contact with the welded metal the face of the other plate, and by the application of pressure and heating electric current of welding the face of the second plate to the said welded metal at the spots, and of forcing back the welded metal and crowding metal into the depressions so that the plates come into immediate contact.

6. The method of fastening two pieces of metal together, face to face, which consists of welding a flat metallic body to the surface of one of the pieces of metal by the application of pressure and heating electric current and forming a depression or depressions there beside by forcing a tool upon said surface, of bringing into contact with the metallic body the surface of said second piece of metal, and by the application of pressure and heating electric current of welding the second piece of metal to the metallic body and forcing the metallic body into the adjacent depression or depressions so that the faces of the said pieces of metal come into immediate contact.

7. Method of fastening two metal plates together, face to face, which consists of welding a flat metallic disk to the surface of one of said plates by the application of pressure and heating electric current and forming a depression thereabout in close proximity thereto, of bringing into contact with the metallic disk the surface of the second said plate, and by the application of pressure and heating electric current of welding the second plate to the metallic disk and forcing backward and displacing the metallic disk so that the plates come into immediate contact.

8. The method of fastening the surfaces of two plates of metal together, face to face, which consists of fusing a metallic body to the said surface of one of the plates with a depression in said surface in close proximity to the metallic body, of bringing into contact with the metallic body the surface of the other plate, and by the application of pressure and heating electric current of welding the surface of the second plate to the metallic body and forcing the metallic body into the said depression so that the plates come into immediate contact.

9. The method of fastening two metal plates together, face to face, which consists of first fastening to the surface of one of the plates at spaced intervals a plurality of metal disks so as to prevent their displacement during the subsequent adjusting and welding operations, of subsequently bringing the second plate into contact with the opposite faces of the disks, and by the application of pressure and heating electric current of welding the contacting parts together.

10. The method of fastening two pieces of metal together, face to face, which consists of fusing to the surface of one of the plates at intervals thereon small metallic bodies, of bringing the second plate into contact with the opposite faces of the metallic bodies, and by the application of pressure and heating electric current of welding the contacting parts together.

11. The method of fastening two metal plates together, face to face, which consists of placing a plurality of disks or flat pieces of metal at intervals or spots on the surface of one of the plates with depressions in said surface surrounding said spots, of bringing the second plate into contact with the opposite faces of the disks or pieces of metal, and by the application of pressure and heating electric current, of welding the contacting parts together of forcing back the disks and crowding metal into the adjacent depressions so as to allow the parts to come into immediate contact.

12. The method of fastening two pieces of metal together, face to face, which consists of placing a flat metallic body on the surface of one of the plates with a depression or depressions in said surface immediately adjacent thereto, of bringing the second plate into contact with the opposite face of the flat metallic body, and by the application of pressure and heating electric current of welding the contacting parts and forcing the pieces of metal into immediate contact.

13. A machine for preparing a metal plate for a welding operation, consisting of means for welding pieces of metal to the surface thereof and of means for forming depressions about the welded pieces and immediately adjacent thereto in the said surface.

14. A machine for preparing pieces of metal for welding operations, consisting of means for welding metal at spots on the surface thereof and of means for forming depressions in this surface immediately adjacent to the said spots.

15. A machine for forming projections upon the surface of a piece of metal, consisting of means for electrically welding metal to the surface of the piece of metal at spots thereon and of means for forming depressions in this surface immediately adjacent to the said spots.

In testimony whereof I have hereunto signed my name in the presence of two subscribing witnesses at Atlanta, in the county of Fulton and State of Georgia, this 1st day of May, 1920.

CHARLES H. KICKLIGHTER.

Witnesses:
D. L. WALDRIP,
J. E. MEDLOCK.